Aug. 8, 1961 P. C. KEITH 2,995,426
ELEVATED FLUIDIZING REACTOR
Filed Dec. 4, 1956 2 Sheets-Sheet 1

INVENTOR.
PERCIVAL C. KEITH
BY *Paul W. Garbo*
AGENT

Aug. 8, 1961  P. C. KEITH  2,995,426
ELEVATED FLUIDIZING REACTOR
Filed Dec. 4, 1956  2 Sheets-Sheet 2

INVENTOR.
Percival C. Keith
BY Nathaniel Ely
ATTORNEY.

United States Patent Office 2,995,426
Patented Aug. 8, 1961

2,995,426
ELEVATED FLUIDIZING REACTOR
Percival C. Keith, Peapack, N.J., assignor to Hydrocarbon Research, Inc., New York, N.Y., a corporation of New Jersey
Filed Dec. 4, 1956, Ser. No. 626,107
9 Claims. (Cl. 23—288)

This invention relates to an improved reactor for carrying out reactions in a dense phase fluidized bed of particulate material. More particularly, the invention relates to such a reactor wherein the fluidized bed is supported at a considerable distance above the ground or foundation level.

With the growing use of the fluidizing technique, i.e., the maintenance of a mass or bed of finely divided solids in a fluent and turbulent condition by the upward passage therethrough of a gasiform stream, several processes have been encountered where it is highly desirable to use one or more fluidized beds disposed high above the ground. Thus, in roasting metallic sulfides such as pyrites, in reducing metallic oxides, in calcining limestone, or in reactions with solid catalysts, a series of fluidized beds, vertically aligned one above the other, has been proposed to achieve high efficiency of operation. For processes wherein the fluidizing gases are at substantially atmospheric pressure or at moderate pressures not exceeding about 100 pounds per square inch gauge (p.s.i.g.), adequate efficiency of operation may be achieved with relatively shallow fluidized beds, usually less than 8 feet in depth. However, at higher pressures, deeper fluidized beds are generally required to achieve efficient contact of the compressed fluidizing gases with the fluidized solids. Accordingly, particularly in processes conducted at pressures above about 100 p.s.i.g. in a series of fluidized beds, each at least 8 feet in depth, the structural stresses in the reactor resulting from the bouncing, bumping and swaying of the fluidized solids become serious.

In several instances, each fluidized bed is from about 10 to 20 feet in depth and the structural parts of the reactor between adjacent beds may easily account for an additional 10 to 20 feet in reactor height. In such reactors, the bottom of one or more fluidized beds is at least about 30 feet above the ground. Under these circumstances, a very difficult structural problem for commercial-size reactors with a diameter of at least 8 feet, and frequently in the range of 10 to 25 feet, is encountered. While most reactors are built in the form of cylindrical towers, other shapes are occasionally used but the same structural problem arises when the horizontal cross-sectional area of such a reactor is equal to or exceeds that of a cylindrical reactor having an 8-foot diameter.

The structural problem arising from the bouncing, bumping and swaying of the fluidized solids in a commercial-size reactor in which the bottom of one or more deep fluidized beds is disposed at an elevation of at least 30 feet is particularly acute with heavy solids which give fluidized beds with densities of at least about 75 pounds per cubic foot. Many metallic oxides and sulfides have fluidized densities of 100 pounds per cubic foot and higher. The higher the fluidized density the greater will be the vibrational and other stresses in the reactor. Since the charge of solids in each fluidized bed in a reactor of commercial size will amount to several tons, it will be readily appreciated that the stresses produced by the fluidized mass require attention with respect to not only vibrations but also moments, i.e., tendencies to move about the foundation or anchorage of the reactor. With bouncing and swaying fluidized masses of many tons supported at distances of 30 feet or more above the ground, moments of substantial magnitude are generated.

A principal object of this invention is to provide an improved fluidizing reactor in which the foregoing structural stresses are minimized.

This and other objects and advantages of the invention will be apparent from the description which follows.

It has been found that the vibrational stresses and moments in reactors having at least one fluidized bed disposed with its bottom 30 feet or more above the ground or foundation are substantially reduced by placing extended surfaces in a generally vertical position throughout the fluidized bed. While vertical surfaces are preferred, the extended surfaces may in part or in total be slightly inclined to the vertical, i.e., may be slanted not more than about 15° relative to the vertical. With reactors having fluidized beds with a horizontal cross-sectional area equal to that of a cylinder at least 8 feet in diameter, extended surfaces are introduced into the beds to provide between about 6 and 12 square feet of surface in contact with each cubic foot of fluidized solids. The surface of an 8-foot diameter cylinder contacting a mass of fluidized solids therein corresponds to only 0.5 square foot of surface per cubic foot of fluidized solids and, obviously, this ratio of surface to volume is even smaller for many commercial reactors ranging from 10 to 25 feet and more in diameter. In short, the extended surface introduced into commercial reactors in accordance with this invention increases the ratio of surface to volume by a factor of at least 12 to 24, starting with a minimum reactor diameter of 8 feet.

With a fluidized bed having a depth of 8 feet, the volume of fluidized solids in the minimum 8-foot diameter reactor is at least 400 cubic feet. Considering solids with a fluidized density of 75 pounds per cubic foot, the charge of fluidized solids filling 400 cubic feet has a weight of 30,000 pounds, which again is only the minimum weight encountered. To support such a fluidized bed with its bottom 30 or more feet above the ground has presented serious structural problems in view of the considerable bouncing and swaying of the fluidized mass within the reactor. However, by providing from 6 to 12 square feet of surface in each cubic foot of the fluidized bed, the violent vibration of the reactor caused by the fluidized solids substantially vanishes or becomes so small as to present no special problem of reactor construction. The large bubbles, geysers, surges, and like irregularities commonly noted in fluidizing large beds of solids with high densities, i.e., at least about 75 pounds per cubic foot of fluidized solids, are by this invention substantially eliminated with the result that not only vibrational stresses are sharply curtailed but also the efficiency of contact between the gases and solids of the fluidized mass is materially increased. Thus, the efficiency of contact for a deep fluidized bed having a diameter of 8 feet and a surface-to-volume ratio in the range of 6 to 12 square feet per cubic foot may be as much as five times as great as the efficiency of contact for the same fluidized bed with the normal surface-to-volume ratio of about 0.5 square foot per cubic foot. That is to say, the latter fluidized bed lacking the extended surfaces of this invention behaves as though four-fifths of its solids were not in effective contact with the fluidizing gas.

For a further description of the invention, reference is now made to the accompanying drawings of which:

Figure 1:
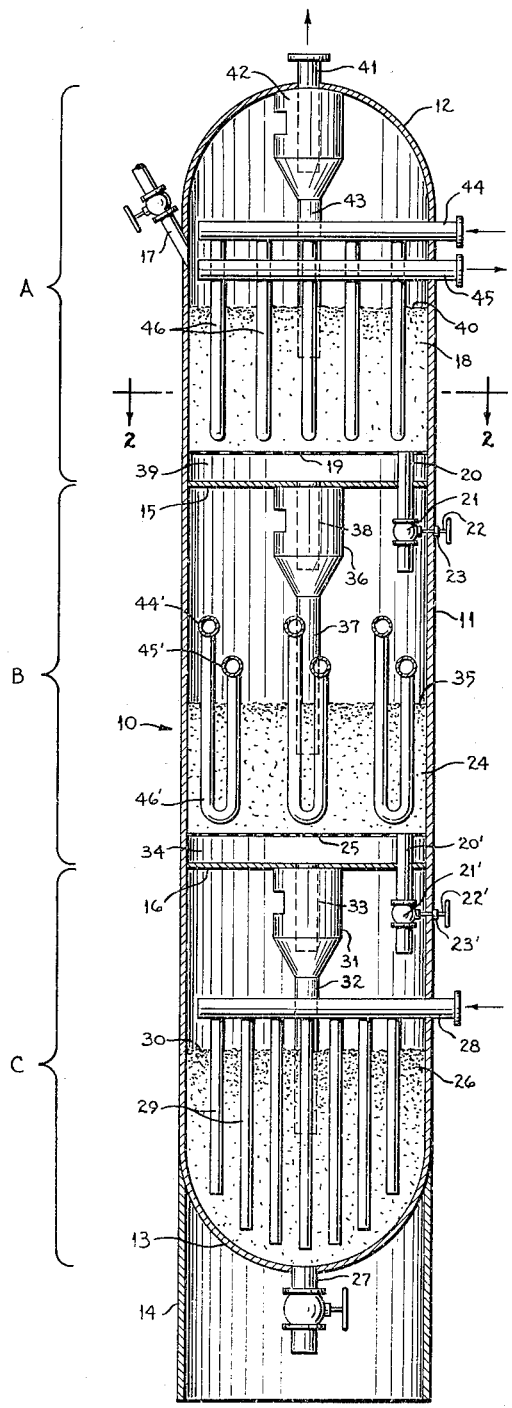
FIGURE 1 is a sectional elevation of an illustrative three-stage reactor embodying the invention.

Three-stage reactor 10 of FIGURE 1 comprises a cylindrical tower 11 having a semispherical top 12 and bottom 13. Reactor 10 is supported on a cylindrical extension 14 of tower 11 projecting beyond bottom 13 and its associated elements. Extension 14 is usually provided with access openings (not shown) and is of sufficient height to give the desired headroom under bottom 13. Horizontal partitions 15 and 16 disposed at intermediate levels divide tower 11 into three reaction sections or stages A, B and C.

Finely divided solids may be supplied to section A through valved inlet 17. Fluidized bed 18 of the solids is supported on perforated plate 19 within section A and solids from bed 18 may be passed to section B through discharge tube 20 extending from perforated plate 19 through partition 15 into section B. Valve 21 controls the flow of solids through tube 20. Stem 22 of valve 21 extends through packing 23 disposed in the wall of tower 11 so that valve 21 may be operated externally of reactor 10.

The solids discharging from tube 20 fall into fluidized bed 24 in section B supported on perforated plate 25. As already described in connection with section A, solids may be discharged from fluidized bed 24 through tube 20' having valve 21', stem 22' and packing 23'. The solids discharged from tube 20' fall into fluidized bed 26 in section C and may be withdrawn therefrom through valved outlet 27.

While the solids flow in succession from the uppermost to the lowermost section of reactor 10, the fluidizing and reacting gas stream flows countercurrently from the lowermost to the uppermost section. The gas stream enters header 28 disposed in the upper portion of section C and flows downwardly through the depending tubes 29 to discharge from the bottom open ends thereof and then flow upwardly through bed 26. The gas stream leaves fluidized bed 26 at its pseudo-liquid level 30 and entrained particles are largely disengaged from the gas stream before it enters cyclone separator 31. Therein residual entrained particles are substantially eliminated from the gas stream and returned to bed 26 through standpipe 32. Central tube 33 of separator 31 discharges the gas stream through partition 16 into plenum chamber 34. Thence, the gas stream passes up through perforated plate 25 and leaves fluidized bed 24 at its pseudo-liquid level 35. As in section C, the gas stream enters cyclone separator 36 provided with standpipe 37 and central tube 38. The gas stream on entering plenum chamber 39 flows upwardly through perforated plate 19 and leaves fluidized bed 18 at its pseudo-liquid level 40. The gas stream exits from reactor 10 through outlet 41 after passing through cyclone separator 42 having standpipe 43 for the return of solids to bed 18 after being removed from the gas stream passing through cyclone separator 42.

Reactor 10 is illustrative of a commercial-size vessel typically having a diameter of at least 8 feet and frequently in the range of 10 to 25 feet. In order to quiet the fluidized beds, particularly upper beds 18 and 24, the bottoms of which are at least 30 feet above the ground or foundation level, extended surfaces are disposed within beds 18 and 24 to provide a surface-to-volume ratio in the range of 6 to 12 square feet per cubic foot of fluidized solids.

Figure 2:
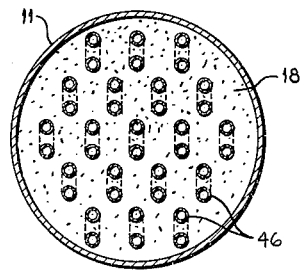
FIGURE 2 is a horizontal section of the reactor of FIGURE 1, taken along the line 2—2 of FIGURE 1.

As shown in FIGURES 1 and 2, a plurality of U-tubes 46 attached to headers 44 and 45 are suspended in section A so that the portion of the exterior surface of U-tubes 46 in contact with fluidized bed 18 together with the portion of the inner surface of tower 11 in contact with fluidized bed 18 falls in the range of 6 to 12 square feet per cubic foot of fluidized solids. While U-tubes 46 may be dummy tubes, i.e., tubes used solely for the purpose of providing extended surface in fluidized bed 18, these tubes may also be used to circulate therethrough a heat exchange medium to control the temperature of fluidized bed 18. Thus, the heat exchange medium may enter each header 44, pass down through the legs of U-tubes 46 attached thereto, and flow up the other legs of U-tubes 46 attached to header 45 from which the heat exchange medium may be withdrawn. Section A would be provided with a plurality of pairs of headers 44 and 45 in order that U-tubes 46 may be distributed substantially uniformly throughout fluidized bed 18 as shown in FIGURE 2.

Similarly, in fluidized bed 24 of section B, extended surface is provided therein. To facilitate visualization of U-tubes 46 in section A, similar U-tubes 46' are shown disposed in fluidized bed 24 but turned 90° with respect to the position of U-tubes 46. For simplicity of the drawing only a few pairs of headers 44' and 45' are shown supporting rows of U-tubes 46' in section B although several more pairs of such headers and their associated U-tubes are contemplated.

Figure 3:
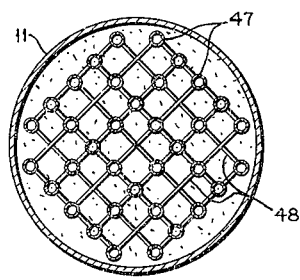
FIGURE 3 is a horizontal sectional view similar to FIGURE 2 but showing a modification of the extended surfaces disposed within the reactor.
Figure 4:
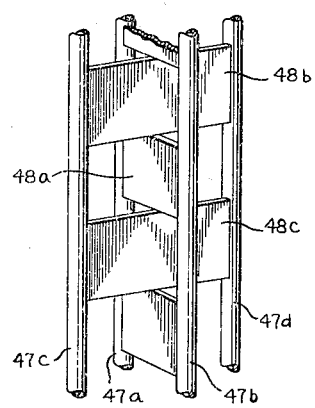
FIGURE 4 is a perspective elevation of a portion of the extended surface in the reactor of FIGURE 3, on an enlarged scale.

In FIGURE 3, an alternative form of extended surface is shown in lieu of U-tubes 46. In this case, a plurality of tubes 47 extend vertically through section A and baffle plates 48 are disposed between tubes 47 to provide extended surface within fluidized bed 18. Comparing FIGURE 3 with FIGURE 2, the number of tubes 47 is less than the number of tubes 46 but the surface-to-volume ratio is made equal by the addition of baffles 48 welded or otherwise fastened between tubes 47. FIGURE 4 shows that baffles 48 are short plates mounted vertically one above the other but at right angles to contiguous plates. This is shown in FIGURE 4 where baffle 48a is welded to tubes 47a and 47b, while the next higher baffle 48b and the next lower baffle 48c are welded to tubes 47c and 47d. Thus, it will be noted that baffles 48 do not compartmentalize the cross section of fluidized bed 18 throughout its height. By interrupting baffles 48 as shown in FIGURE 4, the gases and solids of the fluidized bed 18 are free to move along the horizontal extent of fluidized bed 18 so as to maintain more uniform reaction conditions. In some instances, it may be desirable to make baffles 48 extend continuously along the entire length of tubes 47 so that fluidized bed 18 is in effect divided into a plurality of parallel and contiguous fluidized masses.

In calculating the surface-to-volume ratio as required for the purposes of this invention, the areas of all of the surfaces in contact with the fluidized bed are added and this sum is then divided by the net volume of fluidized solids in contact with the surfaces. In the case of fluidized bed 18 of FIGURES 1 and 2, the net volume is obtained by subtracting the volume of U-tubes 46 immersed in bed 18 from the volume of bed 18 calculated on the basis of the diameter of tower 11 and the depth of fluidized bed 18 measured from pseudo-liquid level 40 to perforated plate 19. The net volume should also take into account the volume occupied by the portion of standpipe 43 dipping into fluidized bed 18 and the area of the exterior surface of the portion of standpipe 43 dipping into fluidized bed 18 should similarly be taken into account in determining the total area of surfaces contacting the fluidized bed. Where plates like baffles 48 are used, both sides of the plates provide surfaces contacting the fluidized solids.

In a specific example of the invention, a three-stage reactor as shown in FIGURES 1 and 2 is used for the reduction of magnetite by passing high-purity hydrogen through the fluidized beds. Tower 11 is 23 feet in diameter and fluidized beds 18, 24 and 26 are each approximately 15 feet in depth. The bottom of bed 18 is 68 feet above the ground and the surfaces in contact with this fluidized bed give a surface-to-volume ratio of 8.4 square feet per cubic foot of fluidized solids. The bottom of bed 24 is 39 feet above the ground and the surfaces in contact with this fluidized bed give a surface-to-volume ratio of 7.2 square feet per cubic foot of fluidized solids. Because of the extended surfaces disposed throughout fluidized beds 18 and 24, bumping, swaying and other vibrational stresses are not generated and tower 11 does not present any structural problems which are different from any other tower of the same size and loading capacity.

Specifically, in the illustrative example of the reduction of magnetite, all of which passes through a 20-mesh screen and is supplied to section A through valved inlet 17, the reduction with hydrogen is effected by maintaining a temperature of approximately 950° F. in fluidized bed 18, 900° F. in fluidized bed 24 and 850° F. in fluidized bed 26. Since the reduction of magnetite by hydrogen is endothermic, the desired reaction temperatures are conveniently maintained by preheating the hydrogen ultimately used in reactor 10 and passing the preheated hydrogen through U-tubes 46 disposed in section A. The preheated hydrogen supplied to U-tubes 46 by way of headers 44 leaves U-tubes 46 by way of headers 45. Thence, the preheated hydrogen is passed through additional piping (not shown) and means for either further heating the hydrogen or cooling it before passing it through U-tubes 46' disposed in fluidized bed 24. Again, the preheated hydrogen entering through headers 44' and leaving through headers 45' to control the temperature of fluidized bed 24 is passed through additional piping (not shown) and temperature adjusting means before it is introduced through headers 28 and dependent tubes 29 to discharge into the bottom of fluidized bed 26.

The solids may flow substantially continuously through inlet 17 and beds 18, 24 and 26 and valved outlet 27 or the flow through the reactor may be at regular intervals. In one operation, involving periodic transfer of solids, fluidized bed 26 is withdrawn from section C by way of valved outlet 27 when 96% by weight of the iron content has been freed of oxygen. Thereupon, fluidized bed 24 is discharged through valved tube 20' into section C and its iron content is approximately 90% by weight reduced or freed of oxygen. Next, fluidized bed 18 with approximately 75% by weight of its iron content freed of oxygen is transferred from section A to section B by way of valved tube 20. Then, fresh magnetite is charged through valved inlet 17 to provide fluidized bed 18 in section A. During the transfer of beds through the stages of reactor 10, hydrogen continues to flow into section C from header 28 and tubes 29 and thence upwardly through sections B and A, exiting through outlet 41.

At a superficial velocity of about one foot per second, the hydrogen passing upwardly through bed 18 maintains the solids in a uniform and quiescent fluidized condition, free of bumping, surging and like irregularities of fluidization encountered in large reactors not having the extended surface of this invention. Fluidized bed 18 has a density of about 100 pounds per cubic foot.

The hydrogen which is introduced into section C by way of tubes 29 has a moisture content of about 0.2% by weight and contains only small percentages of other gases like carbon oxides, methane and nitrogen. The reduction is carried out at an elevated pressure of approximately 400 pounds per square inch gauge. The foregoing conditions of operation and other process details for the reduction of iron oxides is a fluidized condition using high-purity hydrogen are set forth in the co-pending application of P. C. Keith and H. N. Woebcke, Serial No. 331,142, filed January 14, 1953, now U.S. Patent No. 2,900,246. The conditions of temperature and pressure used for effecting conversion of reactant gases comprising hydrogen and carbon monoxide into hydrocarbons and other products by contact with a powdered solid particle catalyst such as iron are described in my U.S. Patent 2,506,221 of May 2, 1950.

While the surfaces in contact with fluidized bed 18 correspond to a surface-to-volume ratio of 8.4 square feet per cubic foot of fluidized solids, it has been found desirable that in lower beds a decreasing ratio of surface-to-volume be used because in the succeeding lower beds the fluidized solids have an increasing content of reduced iron which in turn gives the fluidized solids a greater tendency to bridge between adjacent surfaces or otherwise to hang up on these surfaces. Accordingly, in the present example, the extended surfaces in contact with fluidized bed 24 correspond to a surface-to-volume ratio of 7.2 and in contact with fluidized bed 26 a ratio of 6.0 square feet per cubic foot of fluidized solids.

In spite of the large diameter and depth of the fluidized beds and the considerable elevation of the two upper beds, no serious bumping, swaying and other vibration stresses are encountered in the foregoing operation of the three-stage reactor.

Figure 5:
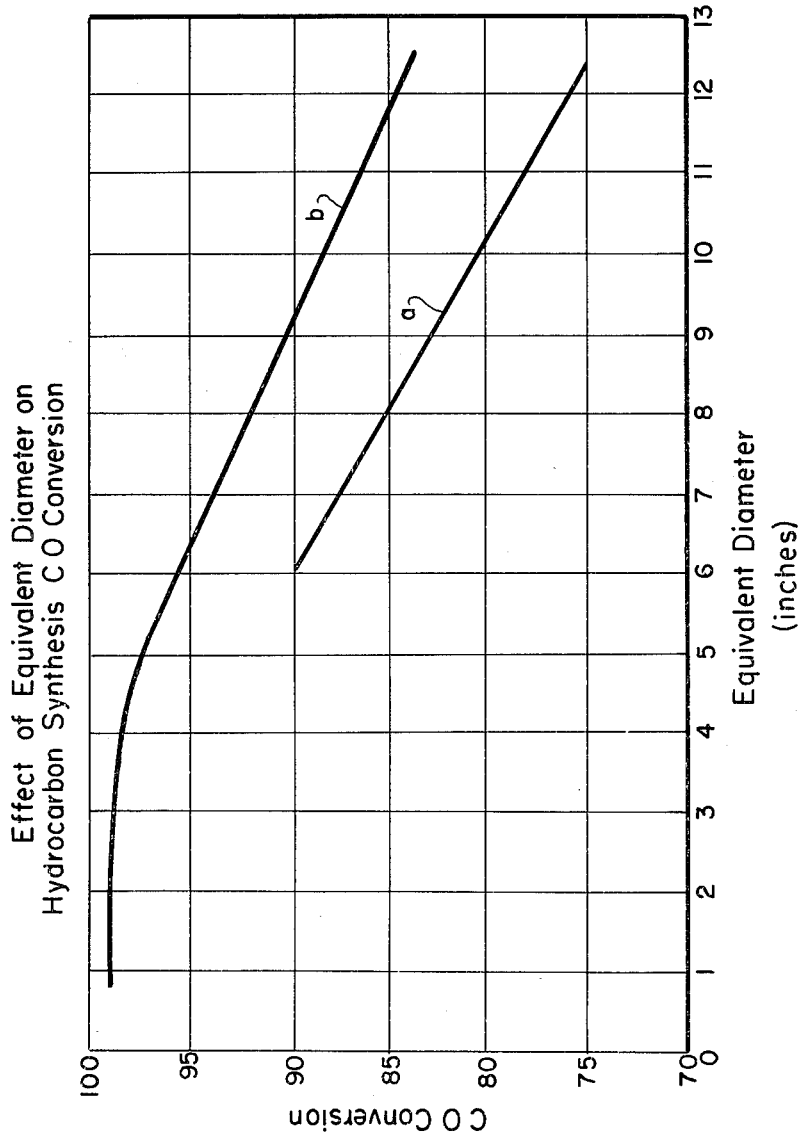
FIG. 5 is a graph of the ratio of CO conversion with respect to equivalent diameter expressed in inches.

FIG. 5 curve A is based on a hydrocarbon synthesis as generally described in my Patent 2,506,221 above mentioned and shows the results of studies made on the effect of equivalent diameter on conversion rates. Equivalent diameter expressed in inches corresponds generally with the ratio of square feet of extended surface to cubic feet of bed by the inverse of 48 as for example equivalent diameters of 2" to 12" correspond with extended surface as hereinabove defined from 4 to 24 sq. ft./cu. ft. Curve A was based on one form of catalyst and showed an increase of conversion of approximately 120% by decreasing the equivalent diameter from 12.4" to 6.0". Curve B is based on a modified form of catalyst and further shows the criticality of CO conversion with respect to the extended surface expressed in equivalent diameter or square feet per cubic foot.

In view of the various modifications of the invention which will occur to those skilled in the art upon consideration of the foregoing disclosure without departing from the spirit or scope thereof, only such limitations should be imposed as are indicated by the appended claims.

What is claimed is:

1. An elongated, elevated reactor adapted to carry out a process wherein a gasiform stream is passed upwardly through a dense fluidized bed of particulate solids, comprising a cylindrical shell at least about 8 feet in diamter and having means to support said shell on a foundation, a base plate member for supporting said bed positioned at least 30 feet above the foundation of said reactor and fastened to the inner cylindrical wall of said shell, means to introduce said solids onto said base plate, members having generally vertical extended surfaces disposed within said shell above said base and distributed substantially throughout the zone of said shell to be occupied by said bed, said vertical surfaces being spaced from adjacent vertical spaces to permit horizontal flow of solids, said zone being at least 8 feet in depth, the area of said extended surfaces together with the area of the inner surface of said shell in said zone being in the range of 6 to 12 square feet per cubic foot of the net volume of said zone, said net volume being the portion of the total volume of said zone unoccupied by said members, means for introducing said gasiform stream as a plurality of separate streams into the bottom of said zone, said extended surface tending to maintain said streams separate, means for withdrawing said gasiform stream from said reactor disposed above said zone, and means to remove solids from said zone.

2. An elongated, elevated reactor adapted to carry out a process for reducing iron oxide wherein a gasiform stream of a hydrogen rich gas is passed upwardly through a plurality of vertically superposed dense fluidized beds of particulate solids of iron oxide comprising a cylindrical shell, and having means to support said shell on a foundation, a perforated plate for supporting each of said beds, the lowermost plate being positioned substantially above the foundation of said reactor and fastened to the inner cylindrical wall of the shell, one of the superposed plates being spaced at least 8 feet above a lower plate to establish zones of said shell occupied by the respective beds of solids, means to introduce said solids to an upper plate to form a bed thereon, means to pass solids from said upper bed to a lower bed, means to draw off solids from a lower bed, members having generally vertical extended surfaces disposed within said shell and above said plates and distributed substantially uniformly throughout the zones of said shell to be occupied by said beds, said vertical surfaces being spaced from adjacent vertical surfaces to permit horizontal flow of solids, the area of said extended surfaces together with the area of the inner surface of said shell in said zones being in the range of 6 to 12 square feet per cubic foot of the net volume of said zones, means for introducing said gasiform stream as a plurality of separate streams into the bottom portions of said beds, said extended surfaces tending to maintain said streams separate in their upper flow, and means for withdrawing the gasiform stream from above said plates.

3. The reactor of claim 1 wherein said members having extended surfaces are U-tubes.

4. The reactor of claim 1 wherein said members having extended surfaces are vertical tubes and plates fastened to said tubes.

5. The reactor of claim 1 wherein at least several of said members having extended surfaces are heat exchangers.

6. The reactor of claim 1 wherein said base is a flat foraminous plate extending horizontally across said shell.

7. The reactor of claim 1 wherein a second base fastened to said inner cylindrical wall of said shell for supporting a second dense fluidized bed of particulate solids is positioned above the first said base and spaced therefrom so that the vertical dimension of said zone is at least 8 feet as aforesaid, and members having generally vertical extended surfaces are disposed within said shell above said second base and distributed substantially throughout a second zone of said shell to be occupied by said second bed, the area of the second said extended surfaces together with the area of the inner surface of said shell in said second zone being in the range of 6 to 12 square feet per cubic foot of the net volume of said second zone, the second said net volume being the portion of the total volume of said second zone unoccupied by the second said members.

8. The reactor of claim 7 wherein the second said area per cubic foot of the net volume of said second zone is greater than the first said area per cubic foot of the net volume of the first said zone.

9. The reactor of claim 7 where said shell has a diameter in the range of 10 to 25 feet, and at least several of the first said and the second said members having extended surfaces are heat exchange tubes.

References Cited in the file of this patent

UNITED STATES PATENTS

| | | |
|---|---|---|
| 2,506,221 | Keith | May 2, 1950 |
| 2,620,262 | Hujsak | Dec. 2, 1952 |
| 2,635,110 | Watson | Apr. 14, 1953 |
| 2,676,668 | Lindsay | Apr. 27, 1954 |
| 2,818,236 | Blaskowski | Dec. 31, 1957 |

FOREIGN PATENTS

| | | |
|---|---|---|
| 1,099,256 | France | Mar. 16, 1955 |
| 1,101,386 | France | Apr. 20, 1955 |
| 183,751 | Austria | Nov. 10, 1955 |